Sept. 18, 1928.  1,684,718
M. R. SHERBINO
METHOD OF MAKING NONEXPANSIBLE HOSE
Original Filed Dec. 13, 1923   3 Sheets-Sheet 1
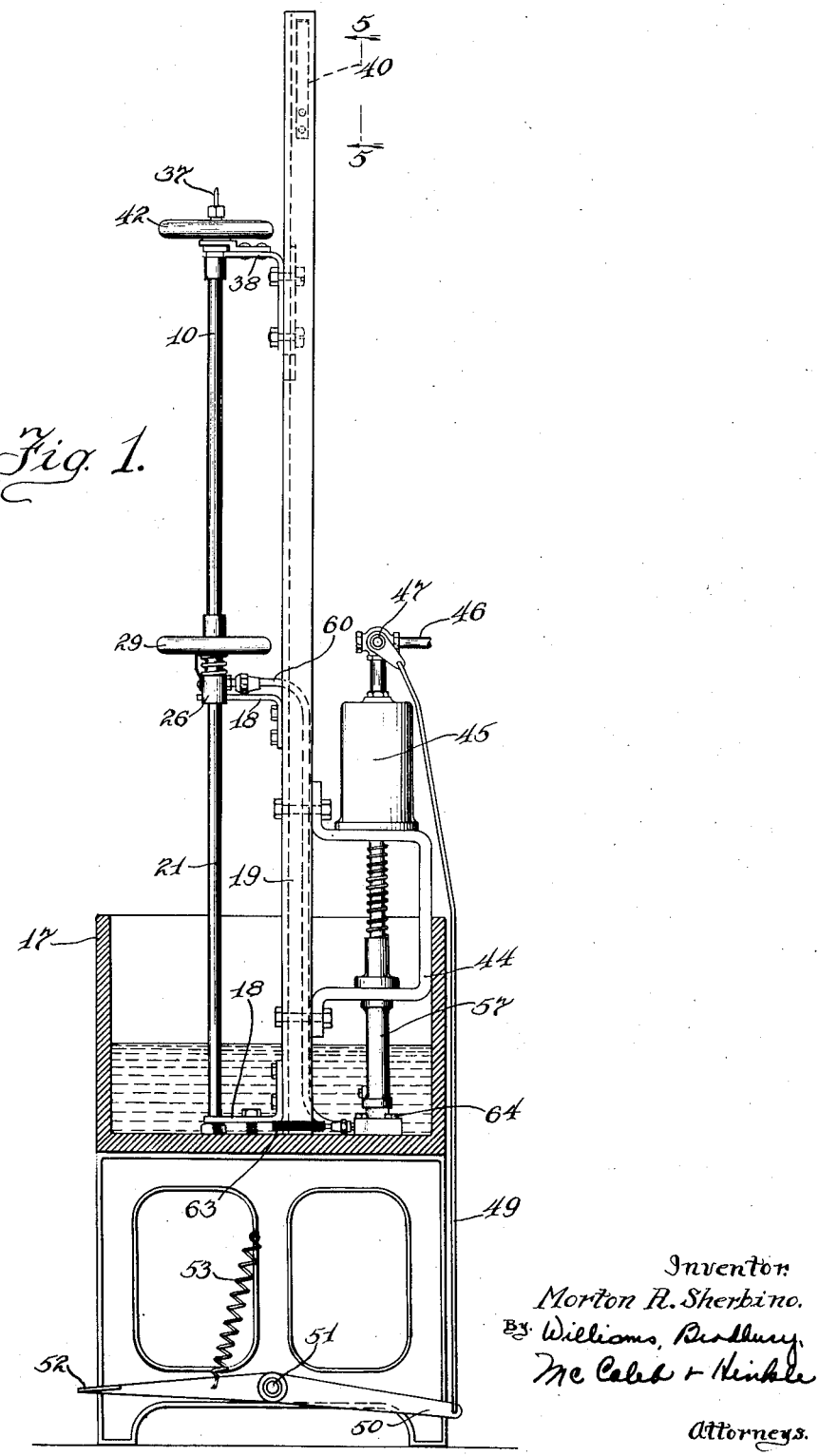

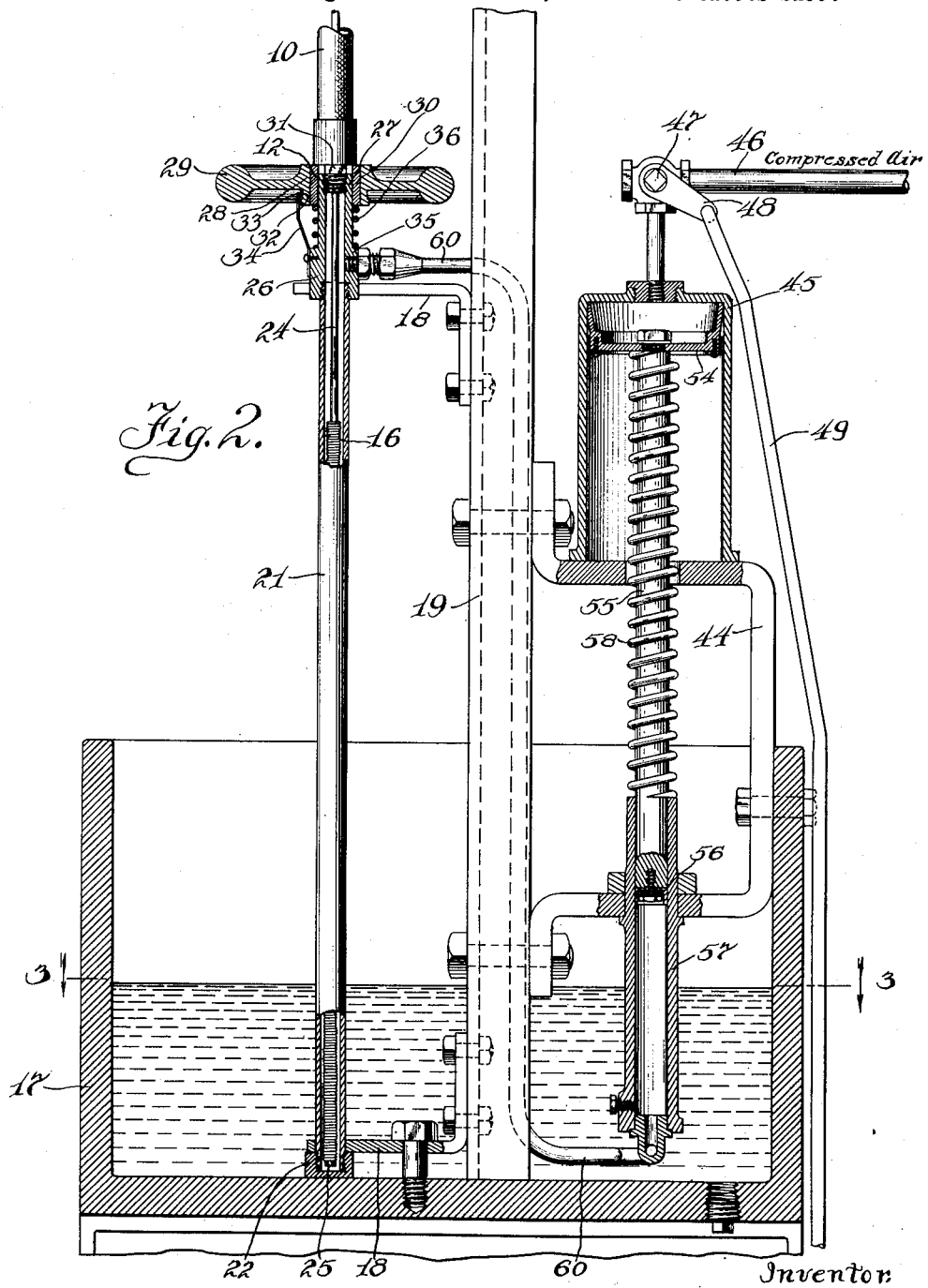

Sept. 18, 1928. 1,684,718
M. R. SHERBINO
METHOD OF MAKING NONEXPANSIBLE HOSE
Original Filed Dec. 13, 1923 3 Sheets-Sheet 3
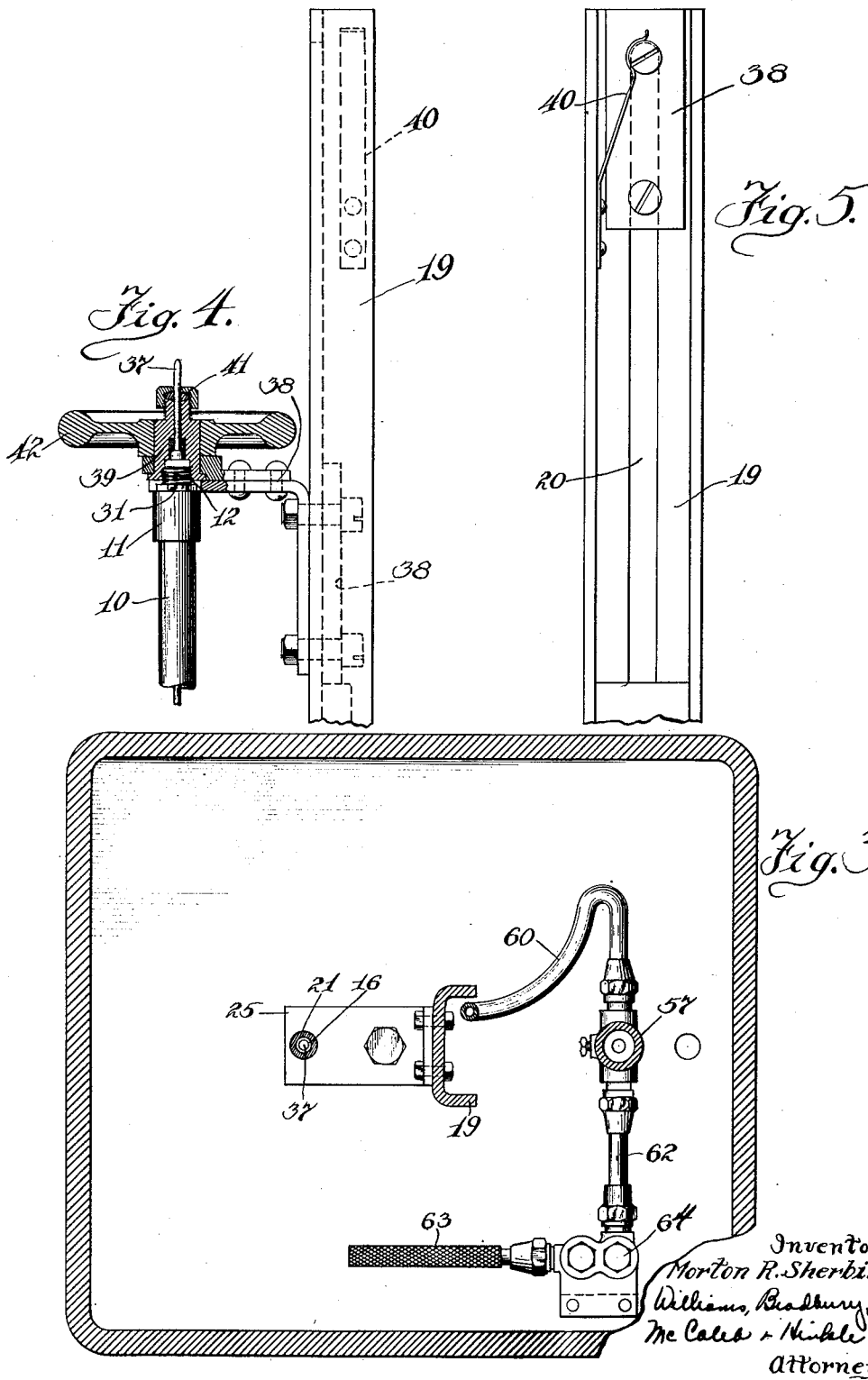

Patented Sept. 18, 1928.

1,684,718

UNITED STATES PATENT OFFICE.

MORTON ROLAND SHERBINO, OF DETROIT, MICHIGAN, ASSIGNOR TO HYDRAULIC BRAKE COMPANY, OF LOS ANGELES, CALIFORNIA, A CORPORATION OF CALIFORNIA.

METHOD OF MAKING NONEXPANSIBLE HOSE.

Original application filed December 13, 1923, Serial No. 680,294. Divided and this application filed October 2, 1926. Serial No. 139,039.

This invention relates to non-expansible hose such as are used to convey the fluid to the brake operating cylinders in hydraulic brake systems for automobiles and other vehicles. In patent to Loughead No. 1,461,130, a hose of the character referred to is shown, and also one method of inserting the coil of wire within the hose core.

This application is a division of my co-pending application Serial No. 680,294, filed December 13, 1923 in which the hereinafter described apparatus for carrying out the method of my invention is claimed.

The present invention has for its object the provision of an improved method for inserting the coil of wire within the bore of the hose.

In constructing the non-expansible hose above referred to, the hose is expanded by forcing a fluid under pressure into the hose, and while it is in its expanded condition, a coil of wire is snugly inserted within the hose bore. Thus when the internal pressure is removed from the bore of the hose, the hose is held in its expanded position and will not readily expand thereafter when subjected to internal pressures, particularly if the internal pressures are less than that to which the hose was subjected when the coil of wire was inserted in the bore.

The present invention is designed to provide a method for utilizing the pressure of the fluid within the hose bore not only to expand the hose, but also to force the coil of wire into the bore of the hose.

It is believed that the invention will be best understood by a detailed description thereof taken in connection with the accompanying drawings, in which Fig. 1 is a side view of the device for inserting the coil within the hose, the fluid retaining tank only being shown in section;

Fig. 2 is an enlarged view of the central portion of the arrangement shown in Fig. 1, certain additional parts being shown in section better to disclose the construction of the apparatus;

Fig. 3 is a transverse section substantially on the line 3—3 of Fig. 2;

Fig. 4 is a section through the lower hose connection shown in Fig. 1; and

Fig. 5 is a view of the guiding and supporting rails shown at the left in Fig. 4 and in the upper portion of Fig. 1.

As the hose structure disclosed in the present application is fully described in the patent above referred to, it will be described only briefly herein. It consists of the hose 10, which may be of any preferred construction, which is adapted to withstand high internal pressures. The fitting at the end of the hose consists of the outer sleeve 11 positioned about the end of the hose and provided with the threaded nipple 12. A fitting is ordinarily provided at each end of the hose, being secured thereto as disclosed in the above mentioned patent, or in any other suitable manner.

The means for inserting the coil of wire within the bore of the hose will now be described. Mounted within the tank 17, by means of the brackets 18 carried by the upright 19, is a vertically positioned tube or cylinder 21 closed at the bottom by means of the cap 22. Positioned within the tube 21 is a rod 24 about which may be positioned the coiled spring 16. The lower end of the rod 24 is provided with an enlarged head 25 to prevent the rod from passing through the coil. It will be noted that, in this embodiment of the invention, the rod 24 with its head 25 constitutes a piston for the support and projection of the flexible re-inforcing member into the hose.

In screw threaded connection with the upper end of the tube 21 is a sleeve 26 (Fig. 2), the upper end of which is internally screw threaded, as indicated at 27, so as to receive the threaded nipple 12 at one end of the hose 10. Positioned about the sleeve 26 is the hub 28 of the hand wheel 29. The hub 28 is provided with a lining 30 which is adapted to engage the outer surface of the sleeve 26, and more particularly the shouldered portion 31 of the hose fitting. The portion 31 is flattened on one or more sides (shown hexagonal in shape) and the opening through the lining 30 is similarly flattened so that the shouldered portion 31 is non-rotatable in the lining 30. The hub 28 is also provided with the external groove 32 arranged to be engaged by the inwardly directed end 33 of the spring member 34 which normally tends to prevent the hand wheel passing upwardly off from the upper end of the sleeve 26. Positioned between the shoulder 35 on the sleeve 26 and the hub 28 is a compression spring 36 which normally acts to urge the hub 28 and hand wheel 29 toward their uppermost positions.

In joining the hose fitting to the sleeve 26, the hose is inserted in position and rotated until the threaded portion 12 of the fitting has traveled within the upper end of the sleeve sufficiently to bring the shouldered portion 31 within the lining 30. The hose is now rotated through the medium of the lining 30 by means of the hand wheel 29. The spring 36 acts, during this operation, to maintain the hand wheel hub firmly in engagement with the hose fitting.

The rod 24 does not terminate at the upper end of the tube 21, but extends upwardly beyond the end of the tube a distance slightly greater than the length of the hose within which the coil is to be inserted. Thus in joining the hose fitting to the sleeve 26, the hose is first passed over the upwardly projecting end 37 of the rod 24.

Slidably mounted within the slot 20 formed in the web of the upright 19, adjacent to the upper end thereof, is a bracket member 38 which carries the threaded sleeve 39 (see Fig. 4), adapted to be joined to the nipple 12 of the fitting at the upper end of the hose 10. As previously stated, the bracket 38 is slidably mounted, and while the hose is being inserted over the rod 37 and joined to the sleeve 26, the bracket 38 and parts carried thereby are maintained in their uppermost positions by means of the spring 40 (see Fig. 5) carried by the upright member 19. When, however, the hose has been attached to the sleeve 26, as previously described, the bracket 38 is lowered, and the sleeve 39 is brought into engagement with the fitting at the upper end of the hose 10. In this process, the upper end 37 of the rod passes through the stuffing box 41 at the upper end of the sleeve 39.

Secured to the sleeve 39 is a hand wheel 42 by means of which the sleeve may be rotated to cause the threaded lower end thereof to firmly engage the threaded portion 12 of the hose fitting. During this process, rotation of the hose is prevented by reason of the flattened shoulder of the fitting being snugly engaged by the bracket member 38.

Carried by the bracket member 44 (Figs. 1 and 2) is a cylinder 45 which communicates through the tube 46 with a source of air under pressure, a valve 47 being provided to admit the air to the cylinder 45. The valve 47 is arranged to be operated by means of the lever 48 pivotally joined to one end of the link 49, the opposite end of the link 49 being pivotally connected to the lever 50, as shown in Fig. 1. The lever 50 is pivotally supported at 51 and is provided with a pedal 52 which is normally held in its elevated position by means of the tension spring 53. Thus, when it is desired to admit air into the cylinder 45, the operator may depress the pedal 52, causing the valve 47 to operate and air to be admitted to the cylinder 45.

Within the cylinder 45 is a piston 54 which is joined by the rod 55 to a piston 56 slidably positioned within the cylinder 57, also carried by the bracket member 44. Positioned about the rod 55 between the upper end of the cylinder 57 and the piston 54 is a compression spring 58 which acts normally to maintain the pistons in their uppermost positions. The lower end of the cylinder 57 communicates with the bore of the sleeve 26 through the medium of the tube 60 (Fig. 3).

Communicating with the lower end of the cylinder is a tube 62 which is joined to the strainer 63 through the check valve 64. The check valve 64 is arranged to admit fluid to the cylinder 57, but to prevent the escape of fluid from the cylinder.

We will assume that the tank 17 has a sufficient supply of fluid, preferably a combination of oil and alcohol, for the operation of the device, and that the cylinder 57, and tubes 21 and 60 are also filled with fluid. The rod 24 is then inserted in the tube 21, and the spring 16 dropped over the rod. The hose 10 is next inserted over the upper end 37 of the rod and attached to the sleeve 26 in a manner previously described. The bracket 38 is then lowered and sleeve 39 is attached to the upper end of the hose. The pedal 52 is now depressed, opening the valve 47 and admitting air under pressure to the cylinder 45. This causes the pistons 54 and 56 to move downwardly. Piston 56 operates to expel the fluid within the cylinder 57 through the tube 60 into the tube 21, and the bore of the hose 10. Due to the fact that the area of the piston 56 is only a fraction of the area of the piston 54, the fluid within the cylinder 57 may be placed under very high pressure. In practice, a pressure of substantially 1000 pounds is usually sufficient to satisfactorily expand the hose.

The end 25 of the rod 24 is acted upon by the fluid under pressure in a manner to tend to force the rod upwardly. Due to the fact that the upper end 37 of the rod passes through the stuffing box 41, it is not acted upon by the fluid so as to tend to force the rod downwardly. The rod 24 may have a diameter of perhaps 1/4". Thus the area of the rod would be approximately 1/16". If now the fluid within the system is under a pressure of 1000 pounds per square inch, the rod 24 will be acted upon by a pressure of approximately 60 pounds tending to force it upwardly. This pressure, it has been found, is sufficient to move the rod together with the coil 16 upwardly so as to position the coil within the bore of the hose. When the coil has moved upwardly to its uppermost position, the ends of the coil will be positioned within the sleeves 13 at the opposite ends of the hose.

The valve 47 is so constructed that in its normal position, it causes the cylinder 45 to communicate with the atmosphere, and in its actuated position joins the cylinder to a source of compressed air. Thus, when the pedal 52 is depressed, the rod 24 and coil 16 immediately move upwardly to position the coil within the hose bore. Upon permitting the pedal 52 to move upwardly, pressure is removed from the cylinder 45, and the pistons 54 and 56 are moved to their uppermost positions by means of the spring 58, thus removing pressure from the fluid within the cylinder. As the piston 56 moves upwardly, a new supply of fluid is drawn into the cylinder through the strainer 63 and tube 62. As soon as pressure is removed from the fluid within the cylinder, the rod 24 will drop or may be readily returned to its lowermost position. The fittings at the opposite ends of the hose may now readily be disconnected from the sleeves 26 and 39, respectively, through the medium of the hand wheels 29 and 42, and the hose removed in the reverse manner from which it was placed in position. It will thus be seen that due to the fact that the piston 54 greatly exceeds in size the piston 56, a fairly nominal pressure of compressed air will act to place the fluid in the cylinder 57 under a very high pressure. The pressure of the fluid within the system not only acts to expand the hose, but also acts to cause the coil 16 to be positioned within the bore of the hose.

While the drawing and the above description are limited to details of the apparatus and of the method of making the hose, it is to be understood that the method of my invention may be carried out by using other apparatus and that slight changes in the method may be made without departure from the principles of my invention as set forth in the appended claims.

Having thus described my invention, what I claim as new and desire to secure by Letters Patent of the United States is:

1. The method of placing a flexible tube in the bore of a hose to maintain it permanently expanded, which consists in providing a piston for the tube and subjecting the interior of the bore of the hose and the face of the piston to a common fluid pressure simultaneously to expand the hose and drive the tube into the bore of the hose.

2. The method of placing a flexible tube in the bore of a hose to maintain it permanently expanded, which consists in providing a piston for the tube, subjecting the interior of the bore of the hose and the face of the piston to a common fluid pressure simultaneously to expand the hose and drive the tube into the bore of the hose, and in controlling the application of the fluid pressure to the bore and the piston by a single valve.

3. The method of placing a flexible tube in the bore of a hose to maintain it permanently expanded, which consists in providing a piston for the tube and subjecting the interior of the bore of the hose and the face of the piston to a common fluid pressure simultaneously to expand the hose and drive the tube into the bore of the hose, said fluid pressure being greater than that to which the hose is to be subjected while in use.

4. The method of placing a flexible tube in the bore of a hose to maintain it permanently expanded, which consists in aligning a pressure cylinder having a piston therein with said hose, in supporting the flexible tube upon the piston within the cylinder, and in injecting fluid under pressure simultaneously to the bore of said hose and to said piston in said cylinder to cause the hose to expand and the piston to move toward the hose and deliver the flexible tube within the bore of the hose while thus expanded.

5. The method of placing a flexible tube in the bore of a hose to maintain it permanently expanded which consists in aligning a pressure cylinder having a piston therein with said hose in supporting the flexible tube upon said piston within said cylinder, in forming a fluid tight connection between adjacent ends of the cylinder and hose in sealing the opposite end with the fluid tight seal and in injecting fluid under pressure simultaneously with the bore of said hose and to said piston to cause the hose to expand and the piston to move toward the hose and deliver the flexible tube within the bore of the hose while thus expanded.

6. The method of placing a flexible tubular core in the bore of a hose to maintain it permanently expanded, which consists in subjecting to a common fluid pressure the bore of the hose to cause it to expand and a fluid pressure operated device tending to force the tubular core into the hose when thus expanded.

In witness whereof, I hereunto subscribe my name this 2nd day of Sept., 1926.

MORTON ROLAND SHERBINO.